(12) United States Patent
Coronado et al.

(10) Patent No.: US 8,909,827 B2
(45) Date of Patent: Dec. 9, 2014

(54) METHOD TO ALLOW A HOST TO REPLACE LOGICAL PATH RESOURCES IT OWNS

(75) Inventors: Juan A. Coronado, Tucson, AZ (US); Roger G. Hathorn, Tucson, AZ (US); Bret W. Holley, Tucson, AZ (US); Dinh H. Le, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1685 days.

(21) Appl. No.: 12/022,544

(22) Filed: Jan. 30, 2008

(65) Prior Publication Data

US 2009/0193142 A1    Jul. 30, 2009

(51) Int. Cl.
*G06F 3/00* (2006.01)
*G06F 5/00* (2006.01)
*G06F 3/06* (2006.01)

(52) U.S. Cl.
CPC ............ *G06F 3/0635* (2013.01); *G06F 3/0617* (2013.01); *G06F 3/067* (2013.01); *G06F 3/0605* (2013.01)
USPC ........................................... 710/38; 709/238

(58) Field of Classification Search
USPC ........................................... 710/38; 709/238
See application file for complete search history.

(56) References Cited

U.S. PATENT DOCUMENTS

| | | | |
|---|---|---|---|
| 5,420,988 A | 5/1995 | Elliott | 395/275 |
| 5,640,603 A | 6/1997 | Meritt et al. | 395/858 |
| 5,925,111 A | 7/1999 | Nagasawa | 710/17 |
| 6,738,839 B2 | 5/2004 | Sinha | 710/39 |
| 6,968,401 B2 * | 11/2005 | McBrearty et al. | 710/38 |
| 7,171,517 B2 | 1/2007 | Muto et al. | |
| 7,275,103 B1 * | 9/2007 | Thrasher et al. | 709/224 |
| 7,487,405 B1 * | 2/2009 | Surlaker et al. | 714/49 |
| 8,769,147 B2 | 7/2014 | Coronado et al. | |
| 2002/0078213 A1 | 6/2002 | Chang et al. | 709/229 |
| 2005/0114591 A1 | 5/2005 | Coronado et al. | |
| 2006/0036782 A1 | 2/2006 | Peterson et al. | |
| 2006/0107012 A1 * | 5/2006 | Coronado et al. | 711/170 |
| 2006/0155844 A1 | 7/2006 | Bayus et al. | 709/224 |
| 2009/0193145 A1 | 7/2009 | Coronado et al. | |
| 2009/0204733 A1 * | 8/2009 | Komatsu et al. | 710/38 |

* cited by examiner

*Primary Examiner* — Elias Mamo
(74) *Attorney, Agent, or Firm* — Terrile, Cannatti, Chambers & Holland, LLP; Stephen A. Terrile

(57) ABSTRACT

A method for replacing logical path resources, a host is able to replace a logical path it owns with a new logical path. Such a system is especially applicable when the condition of "out of resources" has been reached for a port. With this system, a host is guaranteed that it can replace a logical path it owns with a new logical path. It is not necessary for a control unit to have reached its maximum number of logical paths per port. A host is able to replace one logical path with a new logical path any time.

21 Claims, 5 Drawing Sheets

METHOD TO ALLOW A HOST TO REPLACE LOGICAL PATH RESOURCES IT OWNS

BACKGROUND OF THE INVENTION

1. Field of the Invention

The present invention relates to a method, system, and article of manufacture for synchronizing logical path resources.

2. Description of the Related Art

In certain computing environments, a host computer may communicate with a storage control unit, where the storage control unit controls physical storage. The physical storage that is controlled by the storage control unit may be represented logically as a plurality of logical path resources within the storage control unit. Applications in the host computer may perform input/output (I/O) operations with respect to the logical path resources of the storage control unit. For example, an application in the host computer may write to logical path resources of the storage control unit. The storage control unit may maintain a correspondence between the logical path resources and storage media in the physical storage via logical and physical volumes. While data may be physically written to the storage media in the physical storage under the control of the storage control unit, as far as an application in the host computer is concerned, the application performs write operations with respect to the logical path resources in the storage control unit.

Logical path resources may be added, deleted, or otherwise modified within the storage control unit. Certain modifications to the logical path resources of the storage control unit, such as addition of a logical path resource when no path resources are available, may cause a failure of I/O operations that are sent from the host computer to the storage control unit.

For example, to establish a logical path, a host sends an establish logical path message for each logical subsystem the host wants to access. Once a host establishes a logical path, the host can access all the devices in a logical subsystem. As long as the maximum number of logical paths per port has not been reached, a host may establish a new logical path on that port. However, when a maximum number of logical paths per port are reached, a host may not be able to establish new logical paths on that port. For each establish logical path rejected, a host receives an "Out of resources" status indication. In certain systems, to add a new logical path, an operator must remove an existing logical path from that port. Once the logical path has been removed from the port, the host may establish the new logical path. However, it is possible that the establishment of a new logical path from a host may fail again. The failure may occur because another host (e.g., an intervening host) has established a logical path. In this situation, the intervening host steals the logical path slot made available when the operator removed a logical path from the port.

Accordingly, it would be desirable to enable a host to directly replace logical path resources.

SUMMARY OF THE INVENTION

In accordance with the present invention, a system and method for replacing logical path resources is set forth. With the system and method of the present invention, a host may directly replace a logical path it owns with a new logical path. Such a system is especially applicable when the condition of "out of resources" has been reached for a port. With this system, a host is guaranteed that it can replace a logical path it owns with a new logical path. It is not necessary for a control unit to have reached its maximum number of logical paths per port. A host is able to replace one logical path with a new logical path any time.

More specifically, in one embodiment, the invention relates to a method which includes sending, by a host to a storage controller, a logical path replaceable notification to a logical path resource, the logical path replaceable notification indicating the logical path resource may be replaced by an owner host, determining whether to perform a logical path replacement operation, and performing a logical path replacement operation on the logical path having the logical path replaceable notification, the logical path replacement operation dynamically replacing the logical path resource with another logical path resource.

In another embodiment, the invention relates to a system which includes a processor and a computer-usable medium embodying computer program code. The computer program code comprises instructions executable by the processor and configured for sending, by a host to a storage controller, a logical path replaceable notification to a logical path resource, the logical path replaceable notification indicating the logical path resource may be replaced by an owner host, determining whether to perform a logical path replacement operation, and performing a logical path replacement operation on the logical path having the logical path replaceable notification, the logical path replacement operation dynamically replacing the logical path resource with another logical path resource.

In another embodiment, the invention relates to a computer-usable medium embodying computer program code. The computer program code comprises computer executable instructions configured for sending, by a host to a storage controller, a logical path replaceable notification to a logical path resource, the logical path replaceable notification indicating the logical path resource may be replaced by an owner host, determining whether to perform a logical path replacement operation, and performing a logical path replacement operation on the logical path having the logical path replaceable notification, the logical path replacement operation dynamically replacing the logical path resource with another logical path resource.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

In the following description, reference is made to the accompanying drawings which form a part hereof and which illustrate several embodiments. It is understood that other embodiments may be utilized and structural and operational changes may be made.

Figure 1:
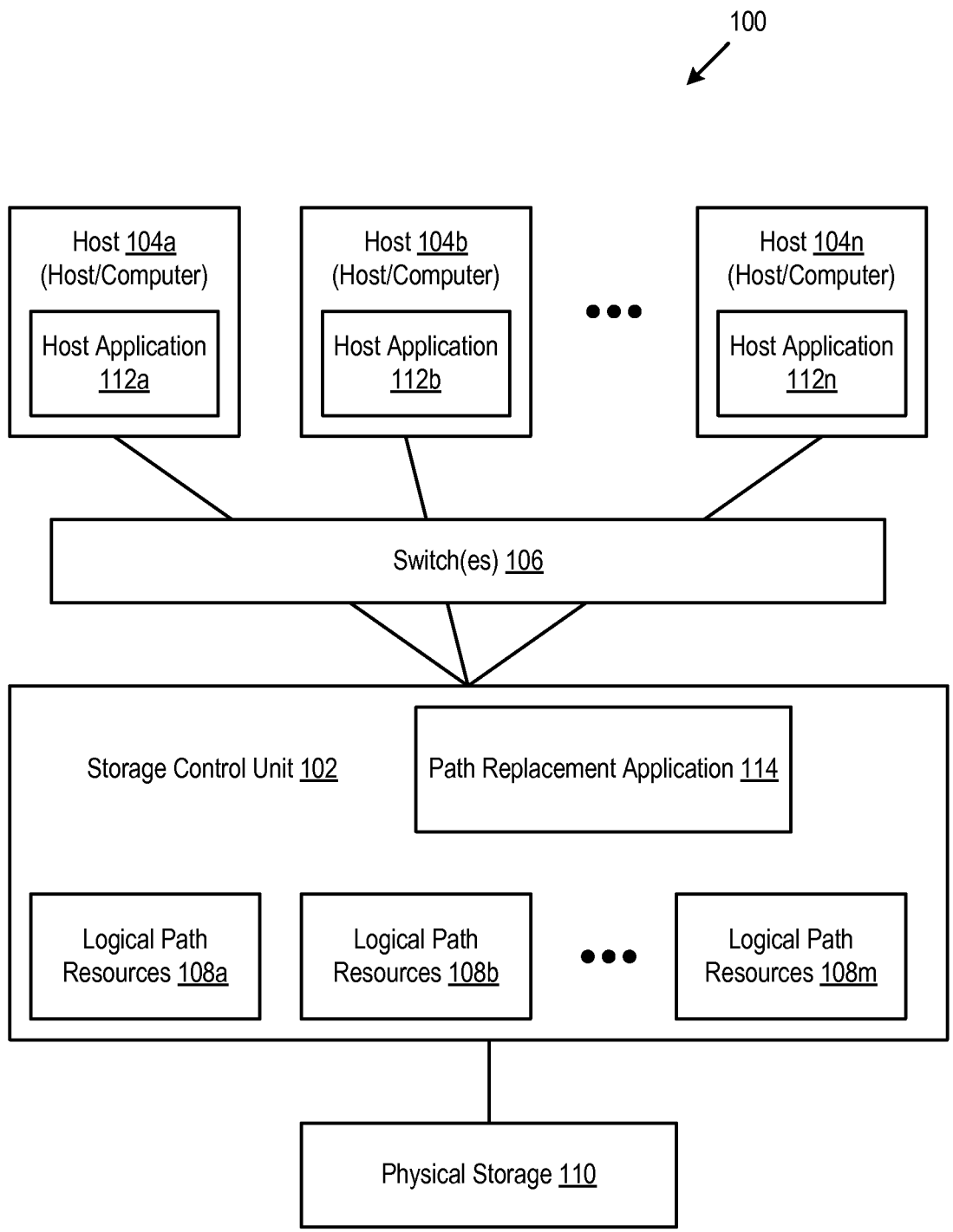
FIG. 1 illustrates a block diagram of a computing environment in accordance with certain embodiments.

FIG. 1 illustrates a block diagram of a computing environment 100 in accordance with certain embodiments of the present invention. The computing environment 100 includes a storage control unit 102 that is coupled to a plurality of hosts 104a, 104b ... 104n over one or more switches 106. The storage control unit 102 includes logical path resources 108a, 108b ... 108m that map to physical subsystems corresponding to a physical storage 110 that is controlled by the storage control unit 102. The plurality of hosts 104a ... 104n include a plurality of host applications 112a, 112b ... 112n that perform I/O operations with the logical path resources 108a ... 108m.

The plurality of hosts 104a ... 104n may comprise any suitable computational device including for example, a personal computer, a workstation, a mainframe, a hand held computer, a palm top computer, a telephony device, a network appliance, a blade computer, a storage server, etc. The storage control unit 102 may include any suitable computational device that controls access to the physical storage 110. The physical storage 110 may include any suitable data storage including for example disk drives, tape drives, etc. In certain embodiments, the one or more switches 106 that couple the plurality of hosts 104a ... 104n to the storage control unit 102 may comprise Fiber Connectivity (FICON) switches. For example, FICON switches that use optical fiber technology may couple the hosts 104a ... 104n comprising an IBM S/390 type computer or other computers to the storage control unit 102.

While FIG. 1 shows a single host application per host, in alternate embodiments a greater or a fewer number of host applications may execute in each host. Additionally, the number of host applications 112a ... 112n that run off the plurality of hosts 104a ... 104n may be different from the number of hosts 104a ... 104n.

A configuration of logical path resources 108a ... 108m in the storage control unit 102 may change because of additions, removals, or modifications to the logical path resources 108a ... 108m. For example, an exemplary host, such as the host 104a, may establish communication with exemplary logical path resources, such as the logical path resources 108b. The logical path resources 108a ... 108m may comprise any plurality of logical storage systems, where each logical storage system includes at least one logical storage volume corresponding to one or more physical volumes stored in the physical storage 110.

In certain embodiments, when a configuration change of the logical path resources 108a ... 108m occurs within the storage control unit 102 that results in an out of resources condition, a path replacement application 114 implemented in the storage control unit 102 may be executed. The path replacement system application 114 is also referred to as a path replacement system and may be implemented in software, hardware, firmware or any combination thereof. Executing the path replacement application 114 allows replacing logical path resources within the computing environment 100. By executing the path replacement application 114, a host may replace a logical path it owns with a new logical path. The path replacement application 114 is especially applicable when the condition of "out of resources" has been reached for a port. With this system, a host 104 is guaranteed that it can replace a logical path it owns with a new logical path. It is not necessary for a control unit to have reached its maximum number of logical paths per port. A host 114 is able to replace one logical path with a new logical path any time.

Figure 2:
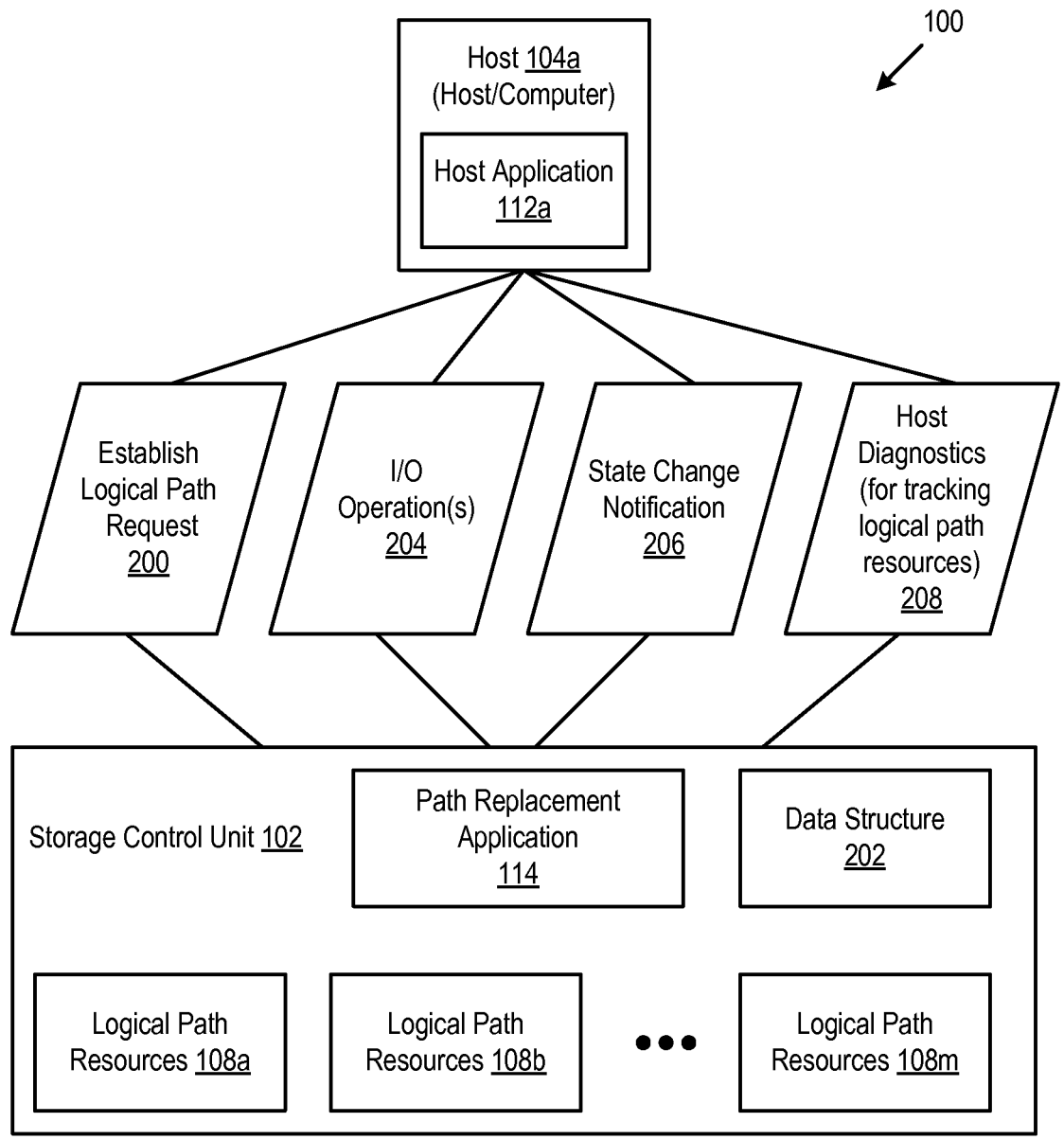
FIG. 2 illustrates a block diagram that shows how communications are preformed in the computing environment, in accordance with certain embodiments.

FIG. 2 illustrates a block diagram that shows how exemplary communications are performed in the computing environment 100, in accordance with certain embodiments. More specifically, an exemplary host 104a, selected from the hosts 104a ... 104n, may include an exemplary host application 112a. The host application 112a may send an 'establish logical path' request 200 to the storage control unit 102, where the 'establish logical path' request 200 seeks to access a logical path resource 108a ... 108m of the storage control unit 102. The path replacement application 114 or some other application implemented in the storage control unit 102 may accept the logical path request 200 if the logical path resources indicated by the 'establish logical path' request 200 is available. To determine the availability of the logical path resources indicated by the 'establish logical path' request 200, the path replacement application 114 may refer to information stored in a data structure 202 implemented in the storage control unit 102. The data structure 202 may record which of the logical path resources 108a ... 108m are available for access. In certain embodiments, the data structure 202 may comprise an array of pointers, where each pointer can reference logical path resources.

Once a logical path between the host application 112a and a logical path resource has been established as a result of the successful completion of the 'establish logical path' request, the host application 112a may perform I/O operations 204 with respect to the logical path resources with which the logical path was established.

In certain embodiments, the configuration of the logical path resources 108a ... 108m may change via additions, removals, or modifications to the logical path resources 108a ... 108m. For example, new logical path resources may be added. If a host attempts to establish a logical path via an establish logical path message when no logical path resources are available, such an operation may result in generation of an out of resources condition. To prevent such an out of resources condition from occurring, in response to a change in the configuration of the logical path resources 108a ... 108m, the path replacement application 114 may perform a path replacement operation.

In certain embodiments, when performing the path replacement operation, the host application 112a can directly replace lower priority logical paths with higher priority logical paths on logical paths and logical path resources 108a ... 108m. Thus, the host application 112a can establish new logical paths even if all logical paths are occupied.

Figure 3A:
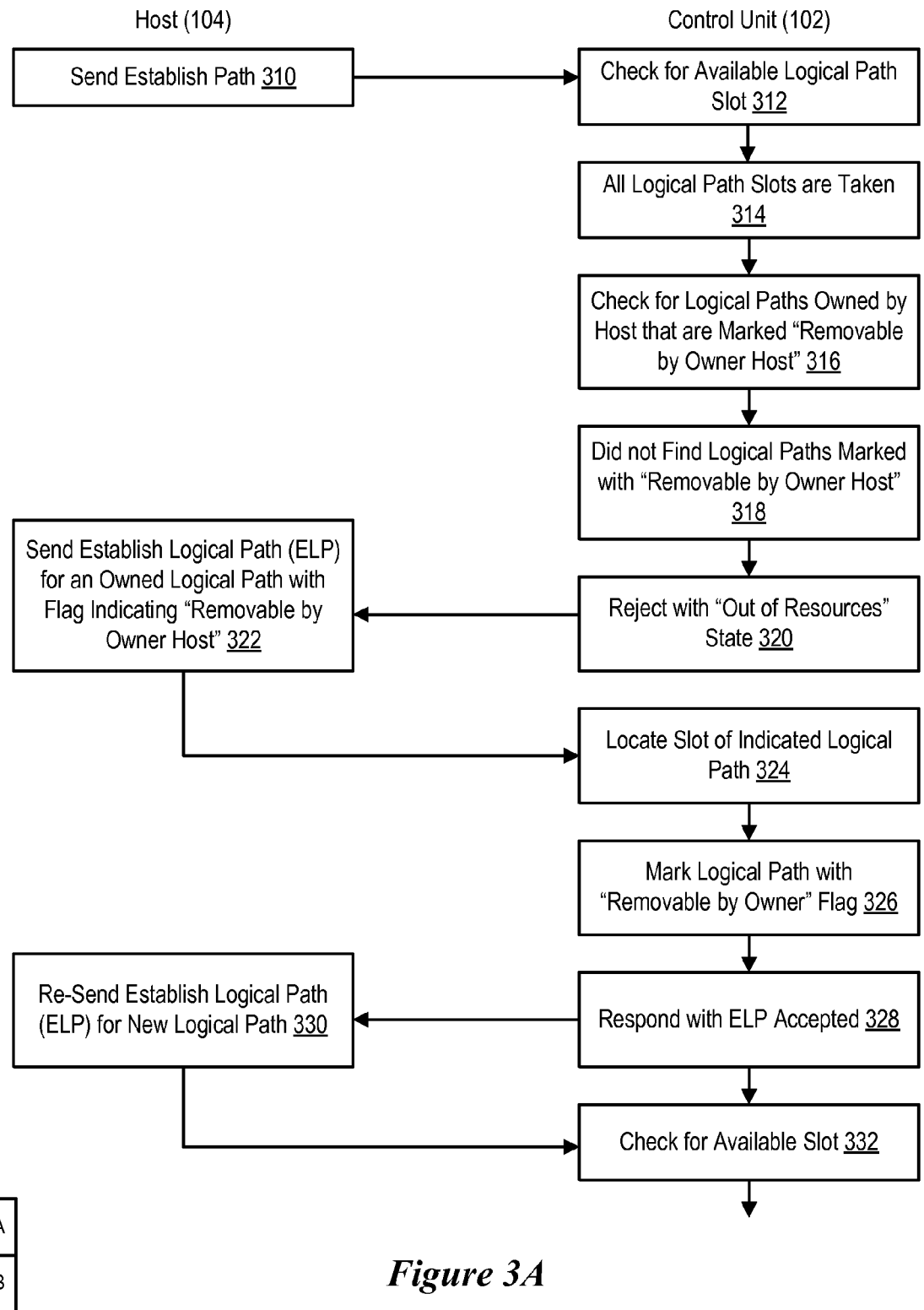
FIGS. 3A and 3B, generally referred to as FIG. 3, show a flow diagram of the operation of the path replacement system, in accordance with certain embodiments.
Figure 3B:
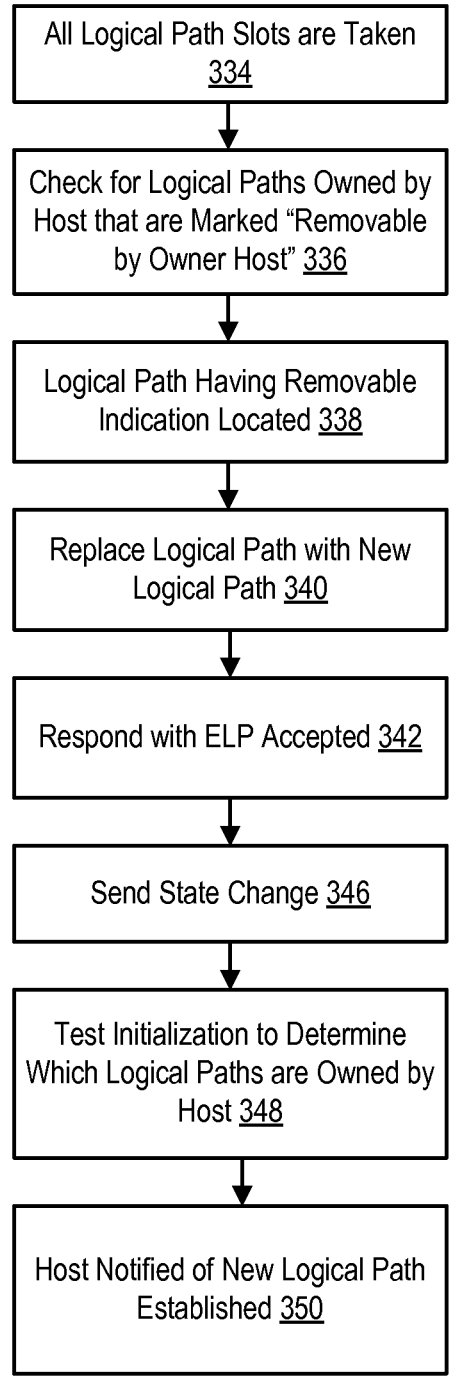

FIG. 3 illustrates an example of operations performed by the path replacement application 114 in the storage control unit 102 under the logical path resources. In general, to replace a logical path, and to preserve the logical path slot for itself, a host performs a plurality of operations. First, the host 104 sends an establish logical path message for the logical path the host 104 wants to replace with a state flag that indicates the logical path as "removable by owner host." When the same host 104 decides to establish the new logical path, the logical path owned by the host 104 that is marked with "removable by owner host" flag, is replaced with the new logical path from the same host. Setting the logical path to state "removable by owner host" prevents other hosts from removing the logical path. The logical path is reserved for the host 104 that marked it "removable by owner host." Therefore, a host 104 can dynamically switch logical paths it owns from one logical path to a new logical path. Next, the host 104 replaces the logical path that is marked with the removable by owner host indication. The host 104 notifies the logical path having a removable by owner host indication of the replacement. Logical paths that are replaced at the control unit 102 to establish a new logical path may also generate host notification of the logical path removal. To provide the notification, the control unit 102 provides a state change notification to the host. The host 104 may in turn perform a test initialization operation to determine which logical paths are no longer established.

More specifically, in one embodiment, the host 104 sends an establish logical path message at step 310. Next, the control unit 102 checks for an available logical path slot at step 312. If all logical path slots are occupied as determined by step 314, then the control unit checks for logical paths that are owned by the host that include a removable by owner host indication at step 316. If the control unit does not locate any logical paths that include a removable by owner host indication as indicated by step 318, then the control unit 102 rejects the establish logical path message and generates an out of resources message at step 320 that is provided to the host 104. Next, the host 104 sends an establish logical path (ELP) message for a particular logical path owned by the host along with an instruction to set the flag indicating removable by owner host at step 322. Next, the control unit locates the slot of the indicated logical path at step 324. Next, the control unit 102 marks the indicated logical path with the removably by owner flag at step 326 and responds with an ELP accepted message at step 328.

The host then resends the establish logical path message for the new logical path at step 330. The control unit then checks for an available logical path slot at step 332. If the control unit 102 again determines that all logical path slots are occupied at step 334, then the control unit 102 checks for any logical paths that are owned by the host that are marked with the removable by owner host indication at step 336. Because a logical path was updated to include the removable by owner host indication, the control unit locates the logical path at step 338. Next the control unit replaces the logical path with the new logical path at step 340 and generates the ELP accepted message at step 342.

In response to establishment of a logical path in step 340, the control unit 102 provides the host 104 with the state change information at step 346. Upon receipt of the state change information, the host executes a test initialization to determine which logical paths are now owned by the host at step 348. The control unit 102 then generates a notification to indicate that a new logical path has been established at step 350.

The described techniques may be implemented as a method, apparatus or article of manufacture involving software, firmware, micro-code, hardware and/or any combination thereof. The term "article of manufacture" as used herein refers to program instructions, code and/or logic implemented in circuitry [e.g., an integrated circuit chip, Programmable Gate Array (PGA), ASIC, etc.] and/or a computer readable medium (e.g., magnetic storage medium, such as hard disk drive, floppy disk, tape), optical storage (e.g., CD-ROM, DVD-ROM, optical disk, etc.), volatile and non-volatile memory device [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 4:
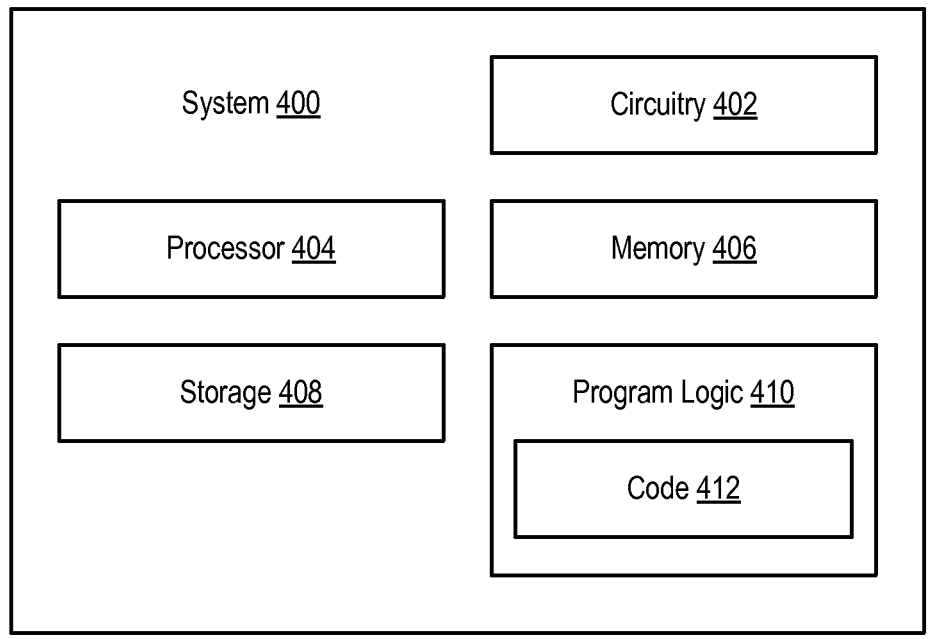
FIG. 4 illustrates a system in which certain embodiments are implemented.

FIG. 4 illustrates a block diagram of a system 400 in which certain embodiments may be implemented. In certain embodiments, the storage control unit 102 and the hosts 104*a* . . . 104*n* may be implemented in accordance with the system 400. The system 400 may include circuitry 402 that may in certain embodiments include a processor 404. The system 400 may also include a memory 406 (e.g., a volatile memory device), and storage 408. Certain elements of the system 400 may or may not be found in the storage control unit 102 or the hosts 104*a* . . . 104*n*. The storage 408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 408 may comprise an internal storage device, an attached storage device and/or a network accessible storage device. The system 400 may include program logic 410 including code 412 that may be loaded into the memory 406 and executed by the processor 404 or circuitry 402. In certain embodiments, the program logic 410 including code 412 may be stored in the storage 408. In certain other embodiments, the program logic 410 may be implemented in the circuitry 402. Therefore, while FIG. 4 shows the program logic 410 separately from the other elements, the program logic 410 may be implemented in the memory 406 or the circuitry 402.

Certain embodiments may be directed to a method for deploying computing instruction by a person or automated processing integrating computer-readable code into a computing system, where the code in combination with the computing system is enabled to perform the operations of the described embodiments. In certain embodiments different storage systems may be used in the computing environment, such as Redundant Array of Independent Disks (RAID), just a bunch of disks (JBOD), Direct Access Storage Device (DASD), tape, etc.

At least certain of the operations of FIGS. 2 and 3 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-4 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising:
   sending, by a host to a storage controller, a logical path replaceable notification to a logical path resource, the logical path replaceable notification indicating the logical path resource is replaceable by an owner host;
   determining whether to perform a logical path replacement operation; and
   performing a logical path replacement operation on the logical path having the logical path replaceable notification, the logical path replacement operation dynamically replacing the logical path resource with another logical path resource.

2. The method of claim 1 wherein:
   the performing a logical path replacement operation occurs in response to an establish logical path operation.

3. The method of claim 1 wherein:
   the performing a logical path replacement operation occurs when all logical path resources are occupied within a storage control unit.

4. The method of claim 1 wherein:
   the determining whether to perform a logical path replacement operation is performed within a storage control unit.

5. The method of claim 1 wherein:
   the logical path replaceable notification prevents other hosts from removing the logical path.

6. The method of claim 1 further comprising:
   generating a host notification of logical path removal in response to replacing the logical path resources.

7. The method of claim 6 wherein:
   the host notification of logical path removal provides a state change notification to the host; and
   the host performs a test initialization operation to determine which logical paths are no longer established in response to the state change notification.

8. A system comprising:
   a processor; and,
   a computer-usable medium embodying computer program code, the computer program code comprising instructions executable by the processor and configured for:
   sending, by a host to a storage controller, a logical path replaceable notification to a logical path resource, the logical path replaceable notification indicating the logical path resource is replaceable by an owner host; determining whether to perform a logical path replacement operation; and
   performing a logical path replacement operation on the logical path having the logical path replaceable notification, the logical path replacement operation dynamically replacing the logical path resource with another logical path resource.

9. The system of claim 8, wherein
   the performing a logical path replacement operation occurs in response to an establish logical path operation.

10. The system of claim 8, wherein
    the performing a logical path replacement operation occurs when all logical path resources are occupied within a storage control unit.

11. The system of claim 8, wherein
    the determining whether to perform a logical path replacement operation is performed within a storage control unit.

12. The system of claim 8, wherein
    the logical path replaceable notification prevents other hosts from removing the logical path.

13. The system of claim 8, wherein the computer program code further comprises instructions executable by the processor and configured for:
    generating a host notification of logical path removal in response to replacing the logical path resources.

14. The system of claim 13 wherein:
    the host notification of logical path removal provides a state change notification to the host; and
    the host performs a test initialization operation to determine which logical paths are no longer established in response to the state change notification.

15. A tangible computer-usable medium embodying computer program code, the computer program code comprising computer executable instructions configured for:
    sending, by a host to a storage controller, a logical path replaceable notification to a logical path resource, the logical path replaceable notification indicating the logical path resource is replaceable by an owner host;
    determining whether to perform a logical path replacement operation; and
    performing a logical path replacement operation on the logical path having the logical path replaceable notification, the logical path replacement operation dynamically replacing the logical path resource with another logical path resource.

16. The tangible computer-usable medium embodying computer program code of claim 15, wherein
    the performing a logical path replacement operation occurs in response to an establish logical path operation.

17. The tangible computer-usable medium embodying computer program code of claim 15, wherein
    the performing a logical path replacement operation occurs when all logical path resources are occupied within a storage control unit.

18. The tangible computer-usable medium embodying computer program code of claim 15, wherein
    the determining whether to perform a logical path replacement operation is performed within a storage control unit.

19. The tangible computer-usable medium embodying computer program code of claim 15, wherein
    the logical path replaceable notification prevents other hosts from removing the logical path.

20. The tangible computer-usable medium embodying computer program code of claim 15, wherein the computer program code further comprises instructions executable by the processor and configured for:
    generating a host notification of logical path removal in response to replacing the logical path resources.

21. The tangible computer-usable medium embodying computer program code of claim 20 wherein:
    the host notification of logical path removal provides a state change notification to the host; and
    the host performs a test initialization operation to determine which logical paths are no longer established in response to the state change notification.

* * * * *